United States Patent [19]
Gill

[11] 3,735,227
[45] May 22, 1973

[54] DIRECT CURRENT MOTOR STARTER CIRCUIT
[75] Inventor: George H. Gill, San Diego, Calif.
[73] Assignee: The United States of America as represented by the Secretary of the Navy, Washington, D.C.
[22] Filed: Jan. 24, 1972
[21] Appl. No.: 220,001

[52] U.S. Cl. ................................................. 318/394
[51] Int. Cl. ................................................. H02p 1/20
[58] Field of Search ..................... 318/346, 347, 349, 318/385, 393, 394, 278, 331, 417, 420–422, 430, 474, 506, 514, 515

[56] References Cited
UNITED STATES PATENTS
2,452,127 10/1948 James ................................. 318/393
3,218,537 11/1965 Stamm ................................. 318/385

Primary Examiner—Bernard A. Gilheany
Assistant Examiner—W. E. Duncanson, Jr.
Attorney—Richard S. Sciascia, Ervin F. Johnston and and William T. Skeer

[57] ABSTRACT

A starting circuit for a direct current motor employs a zener diode to sense the back e.m.f. The zener diode is connected to a switch which effectively disconnects a current limiting impedance out of the armature circuit when the motor has obtained operating speed. In one arrangement, two zener diodes are used in combination to provide an adjustable control for the switching point. Another disclosed arrangement includes a current amplifier connected between the zener diode and the switch to provide for operation of the switch having a relatively high operating power requirement.

6 Claims, 4 Drawing Figures

Patented May 22, 1973

3,735,227

DIRECT CURRENT MOTOR STARTER CIRCUIT

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to a motor control circuit. More particularly, this invention pertains to a starter circuit for a direct current motor. In still greater particularity, but not by way of limitation, this invention pertains to a starting control circuit for a DC electric motor used in remote controlled underwater vehicles. By way of further clarification, this invention pertains to a zener diode type motor control circuit which is relatively free from variations and starting current imposed by vibrations and which does not require frequent calibration or adjustment.

DESCRIPTION OF THE PRIOR ART

As will be well understood by those versed in the art, a DC motor starter employs a series current limiting resistor in the armature circuit which is switched out of the circuit, i.e. shorted, when the motor reaches the desired operating speed. The switching of the current limiting impedance is commonly done with relays which have the armature thereof in parallel with the armature of the DC motor such that they become operative when the back e.m.f. across the armature attains a certain value. The adjustment and maintenance of these relays in normal circumstances is a sensitive and delicate adjustment. In the arduous operating conditions imposed by remote controlled underwater vehicles, the maintenance of the correct adjustment for these relays becomes difficult indeed.

The nature of the difficulty and critical adjustment of these relays is occasioned by the vibration of the device, the wide variety of temperature changes to which the device is subjected, and variations in gravity and acceleration forces on the mechanical springs of the relay occasioned by vibration and acceleration due to changes of buoyancy and normal maneuvering. As a result, voltage sensitive cutout relays of the prior art have performed with only marginally satisfactory results in these difficult environments.

Since the battery life in submarine vehicles is limited and because the devices operated and controlled by the DC motors are critical for the successful operation of the vehicle, the need has long been felt for the trouble-free exact operation of the DC motors. A desirable parameter of operation would be to have a low battery drain, a freedom from frequent adjustments, and a high order of dependability.

SUMMARY OF THE INVENTION

The present invention uses a zener diode as the voltage sensing element which is effectively connected to the switching device so as to remove the current limiting impedance from the armature circuit when the armature has attained a desired rotational speed to induce a sufficient back e.m.f.

The zener diode is optionally used to control a solenoid in a conventional electromagnetic relay or is used to bias a solid state switching device. Similarly, the zener diode may be coupled directly to the switching device or, in instances where the switching device requires a current energization beyond the rating of the zener diode, an amplifier may be interposed between the zener diode and the switching device.

The invention also contemplates the use of a plurality of zener diodes as a sensing element connected such as to permit adjustability of the switching point at which the switching device is energized.

STATEMENT OF THE OBJECTS OF THE INVENTION

It is an object of the present invention to provide an improved starting circuit for electric motors.

A further object of the invention is to provide a starting circuit for a direct current electrical motor.

Another object of the present invention is to provide a starting circuit for electric motors which does not require frequent adjustments and is insensitive to vibration and mechanical acceleration.

Another object of the present invention is to provide a starting circuit for a direct current electrical motor in which a zener diode is used as the sensing element.

A still further object of the present invention is to provide a direct current starting circuit employing a zener diode having a current amplifier means connected thereto to control the impedance switching means in the armature circuit of the motor.

Yet another object of the present invention is to provide an improved starting circuit for a direct current motor employing a zener diode sensing diode sensing element and a solid state switching device.

A still further object of the present invention is to provide an improved starting circuit for a direct current electrical motor employing a plurality of zener diodes connected so as to provide an adjustable point at which the impedance in the armature circuit is changed.

These and other objects of the invention will become more readily apparent from the ensuing specification when taken with the drawings.

DESCRIPTION OF THE PREFERRED EMBODIMENT

Figure 1:
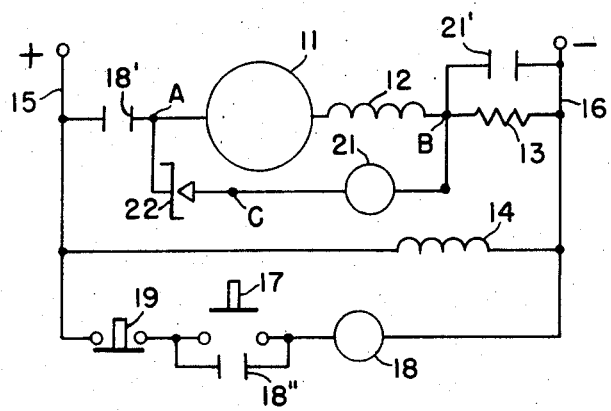
FIG. 1 is a schematic view of the circuit according to the invention.

Referring to FIG. 1, a schematic of the invention in a simplified form will be seen. As will be well understood by those familiar with the art, a circle 11 and inductance 12 represent the armature of the motor to be started. An impedance of a suitable value, as represented by resistor 13, is placed in series with armature circuit of the invention. A field winding 14 is shown as connected across power mains 15 and 16 in the conventional fashion.

A switch 17 connects a solenoid 18 across power mains 15 and 16 so as to provide energization therefor and close contacts 18' to connect the armature circuit across power mains 15 and 16. Solenoid 18 also closes contacts 18'' to keep solenoid 18 energized during the running period of the motor. A normally closed switch 19 is provided to interrupt the current flow through solenoid 18 and thereby release contacts 18' and 18'' for the purpose of stopping the motor.

As will be well understood, the purpose of resistor 13 is to limit the current flow through the armature circuit during the initial operation thereof. Once the armature attains a sufficient rotational speed, a back e.m.f. is generated to oppose the current flowing therein and the current limiting resistor 13 is no longer needed. At this point, resistance 13 is switched out of the circuit.

As previously explained and as will be understood by those familiar with the conventional starting circuit, this switching is accomplished, in the prior art, by either voltage sensitive relay or centrifugal switching arrangements. In both of these prior art arrangements, the switching action overcomes a spring means which tends to hold the contacts shorting resistance in an open position. The adjustment of the tensions on these springs determine the operating point at which the switching action occurred. As previously noted, this adjustment is quite critical and varies from motor to motor. Further, the adjustment of the spring is susceptible to gravity induced variations as might accompany vibrations or sudden accelerations.

Still with reference to FIG. 1, it will be observed that the solenoid 21 operates contacts 21' to short resistor 13 from the armature circuit. A zener diode 22 is connected in series with solenoid 21 and the two units are placed in parallel with the armature circuit. As will be readily understood by those familiar with the art, zener diode 22 remains non-conductive until a certain critical voltage is obtained. The voltage obtained is a characteristic of the particular zener diode. Therefore, it will be seen that no current flows through solenoid 21 until the voltage seen across the armature circuit, indicated by points A and B in FIG. 1, has attained a value sufficient to cause zener diode 22 to commence conduction.

As will be well understood by those versed in the electronics art, a precise voltage at when this conduction occurs is determined by the parameters of zener diode 22 itself. By selection of the zener diode 22 to correspond to the point where the back e.m.f. is sufficient to sustain rotation of the motor when current limiting resistance 13 is removed from the armature circuit thereof, a greater freedom of choice of relays to accomplish this switching is possible. That is, the spring counterbalance to maintain contact 21' open need not be as precise as in a conventional voltage controlled relay. This permits a medium duty spring relay to be used for the switching purpose.

Figure 2:
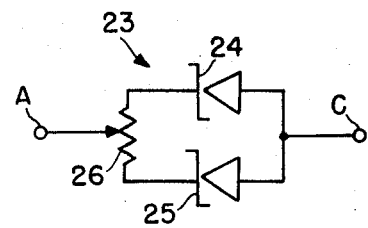
FIG. 2 is a schematic diagram showing a plurality of zener diodes with provision for adjusting their operating point.

Referring now to FIG. 2, an alternative arrangement will be described to replace zener diode 22 with a zener diode circuit 23. As illustrated, zener diode circuit 23 comprises two zener diodes 24 and 25 connected to a common point c. As may be seen with reference to FIG. 1, point c is the junction between a switch relay 21 and zener diode circuit. The other side of zener diodes 24 and 25 are connected in circuit across the fixed resistance portion of potentiometer 26. The movable arm of potentiometer 26 is connected to point A. As will be readily understood, if zener diodes 24 and 25 have different conduction potentials the movable arm of potentiometer 26 may be adjusted so as to provide energization values intermediate to ranges determined by zener diodes 24 and 25. That is, as the movable arm contact of potentiometer 26 is moved along its range, more resistance is placed in one zener diode arm and a corresponding amount is taken from the other arm. It will also be understood that potentiometer 26 may have a resistance characteristic such that the resistance changes effected by the movement of the movable contact are of a non-linear nature. Since such potentiometers are well understood in the electronics art and are available from a variety of suppliers, no further description thereof is deemed warranted.

Figure 3:
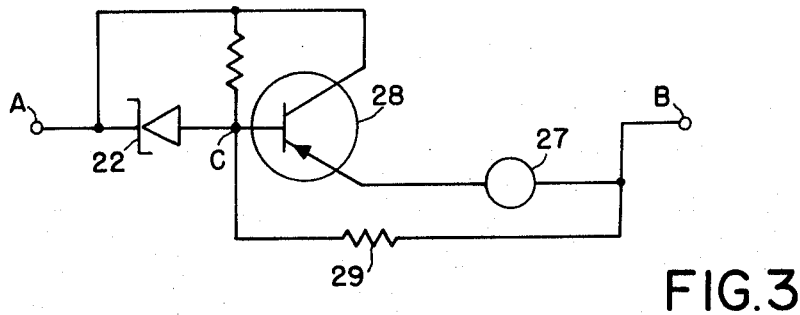
FIG. 3 is a schematic diagram showing a current amplifier connected to the zener diodes sensing element and arranged so as to energize a switching solenoid.

Referring now to FIG. 3, a zener control arrangement is illustrated for energization of a solenoid 27 which requires more operating current than can be normally handled by a zener diode having the desired voltage operational range. As illustrated, solenoid 27 is operatively connected to circuit with a solid state switching device, such as transistor 28. Transistor 28, in turn, is electrically connected to the zener diode circuit for control thereby. For purposes of illustration, the single zener diode 22 is shown, however, it should be clear that zener diode circuit 23 may be used with the arrangement of FIG. 3 as well. Zener diode 22 is connected by means of a resistance 29 to point b so as to sense the voltage drop between points a and b in the same fashion as in circuit shown in FIG. 1. This arrangement permits the use of relatively small, low voltage zener diodes to control the switching of armature currents which are fairly large.

In both circuits shown in FIGS. 1 and 3, the actual switching device is an electromagnetic operated switch. For purposes of simplicity of manufacture, these systems have performed quite satisfactorily. However, it may be desired to avoid the mechanical moving contacts altogether and use in their place a solid state switching device. Such an arrangement using solid state switching components is shown in FIG. 4.

Figure 4:
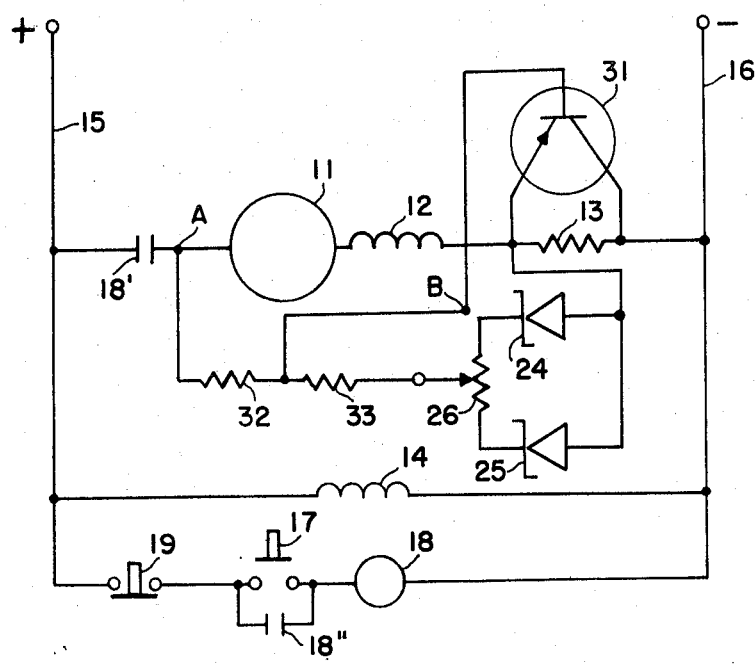
FIG. 4 is a schematic diagram of the device of the invention employing adjustable zener diodes together with a solid state switching device.

Referring to FIG. 4, it will be seen the solid state device 31 has replaced the electromechanical switching device 21 of the circuit of FIG. 1. Also, the zener circuit 23 shown in FIG. 2, has replaced zener diode 22 in the circuit in FIG. 1. Although transistor 31 is illustrated as the switching means to effectively remove current limiting resistor 13 from the armature circuit, it will be readily appreciated by those versed in the art that other solid state switching devices may be used in its place. Further, it should be noted that the resistance presented by resistor 32 and resistor 33 may be used to supply necessary biasing voltage for correct operation of a solid state switching device. The values of these two resistances as well as their incorporation in the circuit will, of course, be dependent upon the particular solid state switching device employed.

For purposes of simplicity, solenoid 18 and the contacts 18' and 18'' operated thereby have been retained in the circuit for the herefor. It will be apparent that like solenoid switch 21, they may be replaced with solid state switching devices, if desired.

Mode of Operation

The operation of the present invention is essentially the operation of the individual elements of the aforedescribed circuit. Referring to FIG. 1, it may be seen that the depressing of starting switch 17 energizes solenoid 18 which closes contacts 18' and 18'' to connect the armature circuit of the motor across power mains 15 and 16 as well as to operate the latching contacts to keep solenoid 18 energized. When contacts 18' are initially closed, resistor 13 limits the current flowing through the armature circuit and prevents overload of the submarine vehicle's power supply system. As armature of the motor gains speed, a back e.m.f. is developed therein, as will be well understood by those versed in the electronics arts. This back e.m.f. is applied to zener diode 22 through the solenoid windings of relay 21.

When the back e.m.f. exceeds the energization potential of zener diode 22, a current is allowed to flow from points a to b paralleling the armature circuit. This electrical current energizes solenoid 21 to close contacts 21' and thereby remove current limiting resistor 13 from the armature circuit.

When it is desired to stop the operation of the motor, switch 19 is depressed which opens the circuit providing current to flow through solenoid 18 thereby releasing contacts 18' and 18''. The releasing or opening of contacts 18' interrupts the current flow through the armature circuit and, accordingly, interrupts the current flow through solenoid 21. This interruption, quite naturally, releases contacts 21' such that they return to the open position placing resistance 13 in the armature circuit for the next power on cycle.

In motor control circuits employing the zener circuit 23, illustrated in FIG. 2, the position of the movable arm of potentiometer 26 determines the voltage point at which conduction of the diode 24 or 25 becomes effective. Except for this adjustment, the operation of the circuit is identical to that described in connection with FIG. 1 regardless of whether the zener circuit 23 is employed or whether a single zener diode, such as shown at 22 in FIG. 1, is employed.

Referring to FIG. 3, and as previously explained, transistor 28 is connected to amplify the current of the zener diode 22 and provides control functions for the solenoid 27. The amplified current permits zener diode 22 to control switching devices having much greater power requirements than could be furnished by zener diode 22 alone.

Similarly, the operation of the circuit of FIG. 4 is straightforward and comprises a sequential operation of the timing elements and switching control elements as previously discussed in connection with FIG. 1. However, rather than use an electromechanical switching device, a solid state switching device is employed. This switching device, illustrated as a transistor 31, effectively removes resistance 13 from the armature circuit. The particular matter in which this control is effective will be obvious to those skilled in the art, but for purposes of completeness, it will be noted that the gate of transistor 31 is connected to the zener circuit with a voltage divider comprising resistors 32 and 33. When the zener circuit is conducting, this voltage divider arrangement biases transistor 31 to a conduction mode thereby effectively shorting resistor 13. However, when the zener diodes are not conducting the transistor 31 is biased to provide a greater impedance, for practical purposes near infinity, such that the current limiting resistor 13 is effectively in series with the armature of the motor.

In the foregoing descriptions it will be noted that field winding 14 is in parallel with the armature circuit. However, it should be obvious to those versed in the art that, with appropriate circuit modifications, the starting control of the invention might be used with series type of motors.

Likewise, as mentioned above, the electromechanical switches presented by solenoid 18 and contacts 18' and 18'' may also be replaced by appropriate solid state circuitry.

From the foregoing description and mode of operation, it will be clear that the device of the invention avoids the disadvantages of the mechanical and electromechanical switching systems of the prior art. The improved electric motor starting circuit resulting from this invention permits an improvement in the operation of DC electric motors particularly as they are used in submarine vehicles. The improved advantages permit the direct current motor to attain operating speed more rapidly and at better defined speeds with a resulting improvement in battery drain and operational dependability. The improved circuit is free from irregularities caused by mechanical vibrations and accelerations as would accompany changes in buoyancy of the vehicle.

The foregoing description taken together with the appended claims constitutes a disclosure such as to enable a person skilled in the electronic and marine engineering arts and having the benefit of the teachings contained therein to make and use the invention. Further, the structure herein described meets the objects of the invention and generally constitutes a meritorous advance in the art unobvious to such a skilled worker not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:

1. A motor control circuit comprising in combination:
   impedance means connected in series with the armature of the motor for limiting the electrical current flowing therethrough;
   switch means connected in parallel circuit configuration with said impedance means and having provision for electrical actuation for selectively shorting said impedance means; and
   a zener diode electrically connected across said armature to sense the voltage thereacross and effectively connected to said switch means for operation thereof in response to the voltage sensed conduction of said zener diode,
   whereby the impedance means is effectively removed from said armature circuit when said motor obtains a predetermined operating speed.

2. A motor control circuit according to claim 1 wherein said switch means is an electromechanical relay.

3. A motor control circuit according to claim 1 wherein said switch means comprises a solid state circuit.

4. A motor control circuit comprising in combination:
   impedance means connected in series with the armature of the motor for limiting the electrical current flowing therethrough;

switch means connected in parallel circuit configuration with said impedance means for selectively shorting said impedance means; and zener diode voltage sensing means electrically connected across said armature to sense the voltage thereacross and effectively connected to said switch means for operation thereof in response to the conduction of said zener diode, said zener diode voltage sensing means including:

two zener diodes having different conduction voltages jointed at one end to a common point;

a potentiometer connected to said zener diodes so as to bridge the other end thereof with a fixed resistance and having an adjustable contact thereof connected to said switch means, whereby the potentiometer may be adjusted so as to operate said switch means at a preselected voltage corresponding to a desired motor speed to effectively remove the impedance means from said armature circuit when said motor obtains predetermined operating speed.

5. A motor control circuit comprising in combination:

impedance means connected in series with the armature of the motor for limiting the electrical current flowing therethrough;

switch means connected in parallel circuit configuration with said impedance means for selectively shorting said impedance means; and zener diode voltage sensing means electrically connected across said armature to sense the voltage thereacross and connected to said switch means by a solid state current amplifier circuit for operation thereof in response to the conduction of said zener diode, whereby the impedance means is effectively removed from said armature circuit when said motor obtains a predetermined operating speed.

6. A motor control circuit according to claim 4 wherein said zener diode voltage sensing means is connected to said switch means by a solid state current amplifier circuit.

* * * * *